(12) United States Patent
Vleurinck et al.

(10) Patent No.: US 10,290,918 B2
(45) Date of Patent: May 14, 2019

(54) ANTENNA FOR USE IN AN RFID TAG

(71) Applicant: NV Bekaert SA, Zwevegem (BE)

(72) Inventors: Jos Vleurinck, Oordegem (BE); Steven Dillien, Ghent (BE); Kristof Degroote, Kortrijik (BE)

(73) Assignee: NV BEKAERT SA, Zwevegem (BE)

( * ) Notice: Subject to any disclaimer, the term of this patent is extended or adjusted under 35 U.S.C. 154(b) by 0 days.

(21) Appl. No.: 15/754,442

(22) PCT Filed: Oct. 4, 2016

(86) PCT No.: PCT/EP2016/073641
§ 371 (c)(1),
(2) Date: Feb. 22, 2018

(87) PCT Pub. No.: WO2017/060222
PCT Pub. Date: Apr. 13, 2017

(65) Prior Publication Data
US 2018/0248248 A1 Aug. 30, 2018

(30) Foreign Application Priority Data
Oct. 9, 2015 (EP) ..................... 15189184

(51) Int. Cl.
*D02G 3/12* (2006.01)
*D02G 3/38* (2006.01)
(Continued)

(52) U.S. Cl.
CPC ............. *H01Q 1/2225* (2013.01); *D02G 3/12* (2013.01); *D02G 3/38* (2013.01); *D02G 3/441* (2013.01); *D06H 1/04* (2013.01); *D06H 1/046* (2013.01); *G06K 19/027* (2013.01); *G06K 19/07773* (2013.01); *H01Q 1/273* (2013.01); *A41D 13/1236* (2013.01); *D10B 2101/20* (2013.01); *D10B 2331/04* (2013.01);
(Continued)

(58) Field of Classification Search
None
See application file for complete search history.

(56) References Cited

U.S. PATENT DOCUMENTS

| 2,443,887 A | 6/1948 | Bohrer |
| 6,727,197 B1 | 4/2004 | Wilson et al. |

(Continued)

FOREIGN PATENT DOCUMENTS

| CH | 233271 | 7/1944 |
| DE | 408882 | 1/1925 |

(Continued)

OTHER PUBLICATIONS

International Search Report dated Sep. 12, 2016 in International (PCT) Application No. PCT/EP2016/073641.

*Primary Examiner* — Kristy A Haupt
(74) *Attorney, Agent, or Firm* — Wenderoth, Lind & Ponack, L.L.P.

(57) ABSTRACT

An antenna for use in an RFID tag comprises an antenna yarn. The antenna yarn comprises metal fibers. The metal fibers are stainless steel fibers. The antenna yarn is wrapped by at least one wrapping yarn thereby covering the full surface of the antenna yarn or of the metal wire or of the bundle of metal wires. The at least one wrapping yarn comprises non-electrically conductive fibers.

15 Claims, 1 Drawing Sheet

Figure 1:
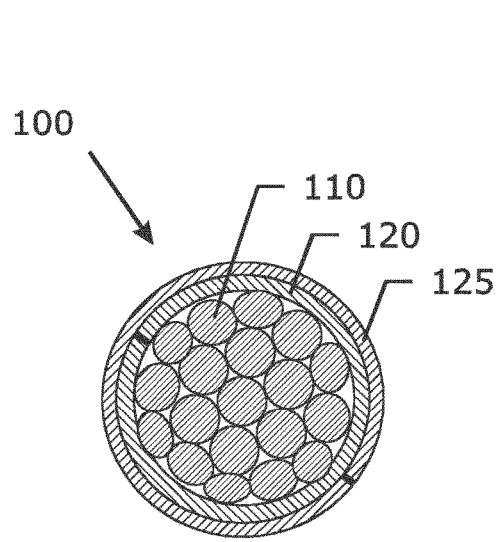

(51) Int. Cl.
  *D02G 3/44*      (2006.01)
  *D06H 1/04*      (2006.01)
  *H01Q 1/22*      (2006.01)
  *H01Q 1/27*      (2006.01)
  *A41D 13/12*     (2006.01)
  *G06K 19/02*     (2006.01)
  *G06K 19/077*    (2006.01)

(52) U.S. Cl.
  CPC ...... *D10B 2401/16* (2013.01); *D10B 2401/18* (2013.01); *D10B 2501/04* (2013.01); *D10B 2503/06* (2013.01)

(56) References Cited

U.S. PATENT DOCUMENTS

| | | |
|---|---|---|
| 2004/0244865 A1 | 12/2004 | Jung et al. |
| 2008/0074272 A1 | 3/2008 | Stobbe et al. |
| 2008/0282665 A1* | 11/2008 | Speleers .................. D02G 3/12 57/212 |
| 2011/0147462 A1 | 6/2011 | Speich |
| 2012/0030935 A1* | 2/2012 | Slade ..................... H01R 12/61 29/825 |
| 2014/0209690 A1* | 7/2014 | Teng .................... G06K 19/027 235/492 |

FOREIGN PATENT DOCUMENTS

| | | |
|---|---|---|
| DE | 14 86 353 | 2/1940 |
| DE | 906 948 | 3/1954 |
| DE | 10 2008 046 338 | 1/2010 |
| EP | 2 897 084 | 7/2015 |
| WO | 2014/204322 | 12/2014 |

\* cited by examiner

ANTENNA FOR USE IN AN RFID TAG

TECHNICAL FIELD

The invention relates to the field of antennas suitable for use in RFID (Radio Frequency Identification) tags. The invention further relates to RFID tags comprising such antennas, RFID tags that can e.g. be attached to laundry items—for instance clothing and bed sheets—used in hospitals or hotels.

BACKGROUND ART

WO2014/204322A1 discloses an RFID tag particularly suitable for use as linen or laundry tag. The RFID tag in a specific embodiment comprises a backing layer, a first adhesive layer overlaying the backing layer, an RFID transponder chip and an antenna overlaying the first adhesive layer, and a second adhesive layer overlaying the RFID transponder chip and the antenna. The layers are laminated together, hermetically sealing the RFID transponder chip and antenna within the RFID tag. In a preferred embodiment, the antenna comprises an elongated multi-strand stainless steel wire, e.g. having 49 strands. The wire is preferably between 0.3 and 0.5 mm in diameter, and encapsulated in a nylon or other polymer insulation. It is mentioned that such a multi-strand wire structure measuring 0.3-0.5 mm in diameter with 49 strands was found to have sufficient flexibility and was less prone to kinking than prior art antennas. The antenna can be stitched to a reinforced adhesive layer prior to lamination. The stitching may comprise a cotton, polyester-cotton, or other substantially durable thread, and preferably holds the antenna in position during lamination and, in combination with the reinforced adhesive layer, during subsequent use of the RFID tag.

DISCLOSURE OF INVENTION

It is an objective of the invention to provide an improved RFID antenna for application on textile fabrics and/or on apparel products and/or on other textile products. It is a specific objective of the invention to provide an improved RFID antenna that provides better comfort for the user, when using a fabric or apparel product provided with the RFID-antenna on a fabric.

The first aspect of the invention is an antenna for use in an RFID tag. The antenna comprises an antenna yarn comprising metal fibers. The metal fibers are stainless steel fibers. The stainless steel fibers are provided to fulfil the antenna function in the antenna. The antenna yarn is wrapped by at least one wrapping yarn thereby covering the full surface of the antenna yarn or of the metal wire or of the bundle of metal wires. The at least one wrapping yarn comprises—and preferably consists out of—non-electrically conductive fibers.

The at least on wrapping yarn wrapping the antenna yarn creates an alternative electrical insulation of the antenna compared to the prior art extrusion coated antennas. It is a beneficial technical effect of the use of the at least one wrapping yarn that a thinner antenna with lower bending stiffness can be obtained compared to the prior art version antenna which is extrusion coated. In extrusion coating, a certain minimum coating thickness is required in order to ensure that the full antenna surface is covered with insulation coating. This is especially important when an antenna yarn is used, as the antenna yarn has an irregular surface; the full surface needs to be coated. The result after extrusion coating is a rather thick antenna. Furthermore, the wrapping yarns result in much less increase of the bending stiffness compared to coated antennas.

It has been noticed that the at least one wrapping yarn causes a compaction of the antenna yarn, reducing its diameter. The wrapping yarn in itself is thin as well. The compaction is even more present when using an antenna yarn with low twist in the antenna yarn (low twist: e.g. less than 200 turns per meter, or even less than 150 turns per meter, or even less than 120 turns per meter) or when using an antenna yarn without twist. Low twist antenna yarns or antenna yarns without twist have certain voluminosity; the at least one wrapping yarn compresses and compacts the antenna yarn.

Thanks to its smaller diameter and thanks to the lower bending stiffness compared to coated antennas, the antenna provides better comfort to users when the antenna is attached to fabrics, e.g. to persons wearing apparel products comprising an RFID-tag comprising antennas according to the invention. Such person will be less aware of the presence of the antenna. Therefore, the invention solves the problem of how to provide an RFID antenna that provides better comfort to users, when using a fabric or apparel product provided with the RFID-antenna on a fabric.

In a preferred embodiment, the antenna comprises an antenna yarn comprising or consisting out of stainless steel filaments; meaning the stainless steel fibers comprise or are stainless steel filaments. More preferably, the antenna yarn comprises or consists out of twisted or cabled multifilament stainless steel fibers.

Preferably, the antenna yarn comprises or consists out of stainless steel filaments; twisted with a twist less than 200 turns per meter, more preferably less than 150 turns per meter, even more preferably with a twist less than 120 turns per meter.

Preferably; the stainless steel fibers—e.g. stainless steel filaments—have an equivalent diameter of less than 20 μm, preferably of less than 15 μm; e.g. 14 μm or 12 μm. The equivalent diameter of a fiber of non-circular cross section is the diameter of a circle with the same area as the area of the cross section of the fiber that has a non-circular cross section. As an example, the antenna yarn can be a bundle of 275 stainless steel filaments of 12 μm diameter, twisted with 100 turns per meter length of the antenna yarn.

In a preferred embodiment, the antenna yarn is a cabled or twisted yarn comprising two or more bundles of stainless steel filaments, preferably wherein the twist is less than 200 turns per meter, preferably less than 150 turns per meter, more preferably with a twist less than 120 turns per meter. Preferably, the stainless steel filaments have an equivalent diameter of less than 20 μm, preferably of less than 15 μm; e.g. 14 μm or 12 μm.

Preferably, the linear density of the antenna yarn is less than 350 Tex, more preferably less than 250 Tex.

Preferably, the antenna yarn comprises at least 80—and more preferably at least 200-stainless steel fibers (and more preferably stainless steel filaments) in its cross section.

As an example, the wrapping yarn or wrapping yarns is/are a multifilament yarn or is/are a spun fiber yarn or is/are monofilament. Preferred multifilament wrapping yarns are texturized multifilament yarns, e.g. polyester multifilament yarns. More preferred are non-entangled texturized multifilament yarns, because they provide best coverage.

In a preferred embodiment, the at least one wrapping yarn is at least one tape. A tape is a particular type of monofilament yarn: a tape has a cross section that is substantially flat, showing a thickness and a width. For the invention, tapes are used that preferably have a width over thickness ratio of the cross section of at least 10, preferably at least 15.

Preferably, the width over thickness ratio of the tapes is lower than 50, more preferably lower than 35. Preferred is where the windings of the tape are not overlapping, but touching each other in subsequent turns of wrapping.

Such tapes in polyester, polyamide, polyolefin (e.g. polyethylene or polypropylene) can be used. Polyester tapes are preferred however, thanks to their interesting combination of properties.

Preferred tapes have a cross section with a thickness between 10 and 40 micrometer, more preferably between 10 and 25 micrometer, even more preferably between 12 and 25 micrometer.

Preferably the width of the cross section of the tape is at least 100 micrometer, more preferably at least 200 micrometer, even more preferably at least 300 micrometer. Preferably the width of the tape is less than 500 micrometer.

Specific examples of cross sections of tapes that can be used in the invention are e.g. 250 micrometer by 12 micrometer, 350 micrometer by 12 micrometer, 370 micrometer by 12 micrometer and 250 micrometer by 23 micrometer, e.g. in polyester.

Preferably, each of the at least one wrapping yarns is wrapped around the antenna yarn with more than 1000 turns per meter length of the antenna yarn; more preferably with more than 2000 turns per meter length of the antenna yarn. The wrapping yarn or wrapping yarns can e.g. be one or more than one tape.

In a preferred antenna, the antenna yarn is wrapped by a wrapping yarn in S-direction; and the antenna yarn is wrapped by a wrapping yarn in Z-direction. In such embodiments the wrapping yarns can each be a tape. Preferably, the number of turns per meter length of the wrapping in S-direction is the same as the turns per meter length of the wrapping in Z-direction. The antenna yarn can be wrapped by the wrapping yarns with more than 1000 turns per meter length of the antenna yarn. More preferably, with more than 2000 turns per meter length of the antenna yarn.

A way of wrapping in Z- and in S-direction around the axis of the antenna yarn is by wrapping part of the wrapping yarns in S-direction and part of the wrapping yarns in Z-direction around the axis of the antenna yarn. The advantage of embodiments as described in this paragraph is that a more stable antenna is obtained. Preferably, the antenna contains the same amount of wrapping yarns wrapping in S-direction as in Z-direction, as the result is the best stability of the antenna and as it enhances the coverage of the antenna yarn. For instance, the metallic filament is wrapped by an even number of wrapping yarns, wherein half of the wrapping yarns is wrapped around the metallic filament in S-direction and the other half in Z-direction. The benefit is a stabilization of the antenna. For instance two wrapping yarns are used in wrapping; one wrapping yarn is wrapped in Z-direction around the antenna yarn, the other wrapping yarn is wrapped in 5-direction around the antenna yarn.

The direction of wrapping of yarns is indicated by the capital letters S or Z. The wrapping is in S-direction if when the wrapped yarn is held vertically, the wrapping spirals slope in the same direction as the middle portion of the letter S. The wrapping is in Z-direction if when the wrapped yarn is held vertically, the wrapping spirals slope in the same direction as the middle portion of the letter Z.

In the antenna yarn, the stainless steel fibers can be present as stainless steel filaments or the stainless steel fibers can be present as fibers of discrete length.

In a preferred embodiment, the stainless steel fibers are present as filaments in parallel untwisted arrangement. It is meant that that no twisting nor cabling operation has been applied to the filaments, such that the filaments lie substantially parallel to each other and substantially parallel to the axis of the antenna yarn. Because of the lower bending stiffness of such antennas, such antennas provide even better comfort to users, when using a fabric or apparel product provided with the RFID-antenna on a fabric, as the user is less aware of the presence of an RFID-antenna on the fabric.

In such embodiment, the antenna yarn is preferably wrapped by a wrapping yarn in 5-direction. More preferably, the antenna yarn is wrapped in S-direction by a multifilament wrapping yarn, more preferably by a texturized multifilament wrapping yarn, more preferably by a non-entangled texturized multifilament wrapping yarn. More preferably, the antenna yarn is wrapped in S-direction by a multifilament wrapping yarn with more than 1000 turns per meter length of the antenna yarn, more preferably with more than 2000 turns per meter length of the antenna yarn. Preferably, the antenna yarn is wrapped by a wrapping yarn in Z-direction. More preferably the antenna yarn is wrapped in Z-direction by a multifilament wrapping yarn, more preferably by a texturized multifilament wrapping yarn, more preferably by a non-entangled texturized multifilament wrapping yarn. More preferably, the antenna yarn is wrapped in Z-direction by a wrapping yarn with more than 1000 turns per meter length of the antenna yarn, more preferably with more than 2000 turns per meter length of the antenna yarn. Preferably, the wrapping twists in S- and in Z-direction are the same in terms of number of turns per meter length of the antenna yarn. As an alternative to the use of multifilament wrapping yarns, tapes can be used to wrap the antenna yarn.

In a preferred embodiment, the antenna yarn comprises twisted or cabled multifilament stainless steel fibers; preferably with a twist less than 200 turns per meter, more preferably less than 150 turns per meter, even more preferably with a twist less than 120 turns per meter. The antenna yarn is wrapped by a wrapping yarn in S-direction. Preferably, the antenna yarn is wrapped in S-direction by a multifilament wrapping yarn, more preferably by a texturized multifilament wrapping yarn, more preferably by a non-entangled texturized multifilament wrapping yarn. Preferably, the antenna yarn is wrapped in S-direction by a multifilament wrapping yarn with more than 1000 turns per meter length of the antenna yarn, more preferably with more than 2000 turns per meter length of the antenna yarn. The antenna yarn is wrapped by a wrapping yarn in Z-direction. Preferably the antenna yarn is wrapped in Z-direction by a multifilament wrapping yarn, more preferably by a texturized multifilament wrapping yarn, more preferably by a non-entangled texturized multifilament wrapping yarn. Preferably, the antenna yarn is wrapped in Z-direction by a wrapping yarn with more than 1000 turns per meter length of the antenna yarn, more preferably with more than 2000 turns per meter length of the antenna yarn. Preferably, the wrapping twists in S- and in Z-direction are the same in terms of number of turns per meter length of the antenna yarn.

Preferred stainless steel fibers, are manufactured via the bundle drawing method. The stainless steel fibers can be present as filaments (with filaments is meant fibers of virtually unlimited length); or the stainless steel fibers can be present as fibers of discrete length. Preferably, the stainless steel fibers have a polygonal, more preferably a hexagonal, cross section.

For the invention, with stainless steel is meant a steel grade comprising at least 10.5% by weight of chromium. Preferably, the stainless steel is stainless steel of the 300 series or of the 200 series according to ASTM A240.

Preferably, the stainless steel fibers—whether fibers of discrete length or filaments—have an equivalent diameter of less than 20 µm, preferably of less than 15 µm; e.g. 14 µm or 12 µm. Preferably, the stainless steel fibers—whether fibers of discrete length or filaments—are produced via the bundle drawing process, resulting in the typical polygonal cross section of the stainless steel fibers or filaments.

Preferably, the stainless steel fibers have a martensite percentage by weight less than 5%, preferably less than 3%, more preferably less than 2%, more preferably less than 1%, more preferably below 0.35%, more preferably below 0.25%, more preferably below 0.1%. Even more preferably, the stainless steel fibers are free from martensite.

The prior art describes the use of stainless steel wire antennas for RFID tags. Stainless steel wires have an end drawn microstructure. An end drawn microstructure is a microstructure characterized by substantially non-equiaxed grains. By drawing stainless steel wire (or stainless steel fibers) the wire or fibers comprise a considerable amount of martensite, typically the martensite content ranges between 10 and 80% by weight of the stainless steel.

It is a surprising benefit of embodiments with low martensite content in the stainless steel that—contrary to the prior art antennas—the RFID-antenna of the invention does not interfere with medical devices, such as MRI-scanners. Consequently, the RFID-antenna according to the invention can be used e.g. for RFID-tags on apparel products or bed sheets that are used in hospitals in or around MRI-scanners, without disturbing the medical images obtained by the medical devices.

Normally, better reading distance can be obtained by using a thicker antenna yarn or a thicker stainless steel wire. However, this is contrary to a request for an antenna that provides more comfort for the user. A combination of a thin antenna that has an excellent reading distance is obtained with such embodiments, thanks to the better electrical conductivity of the antenna.

Martensite in stainless steel fibers can be determined by means of optical microscopic observation of the stainless steel after etching with appropriate etching chemicals.

Alternatively, presence and quantity of martensite in stainless steel can be determined by means of X-ray diffraction (XRD). An alternative method is measuring the saturation field via magnetic measurement, after which the mass percentage of the tested stainless steel sample can be calculated via comparison with the measurement value for 100% martensitic stainless steel.

Preferably in embodiments wherein the martensite content in the stainless steel is less than 5% by weight, more preferably less than 3% by weight, more preferably less than 2% by weight, more preferably less than 1% by weight, more preferably below 0.35% by weight, more preferably below 0.25% by weight, more preferably below 0.1% by weight, even more preferably the stainless steel fibers are free from martensite; the stainless steel in the antenna have an annealed microstructure. An annealed microstructure is a recrystallized microstructure which comprises substantially equiaxed grains. Annealing can be performed by a heat treatment process in which the stainless steel is heated to above its recrystallization temperature, maintaining a suitable temperature during a certain period of time, and then cooling. The annealing process removes martensite formed during drawing of stainless steel fibers and recrystallizes the stainless steel, resulting in substantially equiaxed grains.

For embodiments in which the martensite content in the stainless steel is less than 5% by weight, more preferably less than 3% by weight, more preferably less than 2% by weight, more preferably less than 1% by weight, more preferably below 0.35% by weight, more preferably below 0.25% by weight, more preferably below 0.1% by weight, even more preferably the stainless steel fibers are free from martensite; it is also possible to obtain the low martensite or martensite free stainless steel fibers for the invention by annealing during a sufficient time period at temperatures below the recrystallization temperature. Martensite is then converted into austenite without a complete recrystallization of the microstructure.

The stainless steel fibers can e.g. be made out of stainless steel of the 300 alloy series or of the 200 alloy series according to ASTM A240 (and more specifically according to ASTM A240/A240M-15a, Standard Specification for Chromium and Chromium-Nickel Stainless Steel Plate, Sheet, and Strip for Pressure Vessels and for General Applications, ASTM International, West Conshohocken, Pa., 2015), e.g. alloy 316 or alloy 316L. Preferably, the stainless steel fibers are made out of an alloy comprising at least 12% by weight of nickel.

More preferably, the stainless steel fibers are made out of an alloy comprising at least 12% by weight of nickel and at least 16% by weight of chromium; and preferably between 2 and 2.5% by weight of molybdenum.

Even more preferred is an alloy that has the same specification as alloy 316L (according to ASTM A240/A240M-15a) but with modified nickel content (between 12 and 15% by weight), modified chromium content (between 17 and 18% by weight) and modified molybdenum content (between 2 and 2.5% by weight).

Preferably, the stainless steel fibers are out of a stainless steel alloy comprising between 12 and 15% by weight of nickel, between 17 and 18% by weight of chromium, between 2 and 2.5% by weight of molybdenum, less than 0.03% by weight of carbon and less than 0.1% by weight of nitrogen. Such alloy is preferred because of its low amount of martensite in the end-drawn microstructure of bundle drawn fibers.

Preferably, the stainless steel fibers comprise or are made out of a high nitrogen austenitic stainless steel (HNASS). A high nitrogen austenitic stainless steel alloy is a stainless steel alloy comprising nitrogen content of more than 0.4% by weight. HNASS steel grades stay fully austenitic during the wire drawing or bundled fiber drawing process; no strain induced martensite is formed during the drawing process.

A first example of a HNASS steel grade that can be used in the invention comprises 0.2% by weight of carbon, 17% by weight of chromium, 0.05% by weight of nickel, 0.53% by weight of nitrogen, 3.3% by weight of molybdenum and 10.50% by weight of manganese.

A second example of a HNASS steel grade that can be used in the invention comprises 0.08% by weight of carbon, 21% by weight of chromium, 0.3% by weight of nickel, 1% by weight of nitrogen, 0.7% by weight of molybdenum and 23% by weight of manganese.

The stainless steel fibers can be present in the antenna yarn as filaments; or the stainless steel fibers can be present in the antenna yarn as fibers of discrete length. With filaments is meant stainless steel fibers of virtually unlimited length. An antenna yarn comprising stainless steel filaments can be provided as a bundle of twisted parallel filaments, or as multiply (e.g. a two-ply) twisted or cabled yarn.

With fibers of discrete length is meant that the fibers have a finite length and in most cases a length distribution. Antenna yarns out of fibers with discrete length can be made by means of a yarn spinning process, e.g. ring spinning. Antenna yarns out of fibers with discrete length can be single ply yarns, or multiply (e.g. two ply) yarns.

Stainless steel fibers for use in the invention, whether filaments or fibers of discrete length, can be made according to the bundle drawing method, as is e.g. described in U.S. Pat. No. 2,050,298. Bundle drawn fibers have a characteristic polygonal cross-section.

Preferably, bundle drawn stainless steel fibers for use in the invention have an equivalent diameter of more than 4 μm, preferably of more than 10 μm; and preferably less than 30 μm, more preferably less than 20 μm; more preferably less than 15 μm.

It is also possible to use in the invention single end drawn stainless steel filaments. Such filaments have in most cases a round cross section. Preferred are single end drawn stainless steel filaments with cross section more than 40 μm and preferably less than 100 μm, e.g. 50 μm, 60 μm or 80 μm. An example is a yarn consisting out of 24 stainless steel filaments of 50 μm diameter twisted together with 100 turns per meter.

The second aspect of the invention is an RFID tag comprising a transponder chip and an antenna as in the first aspect of the invention. The antenna is coupled to the transponder chip. The antenna can be inductively coupled to the transponder chip.

Preferably, the RFID tag comprises a transponder chip and two antennas as in the first aspect of the invention. The two antennas are each coupled to the transponder chip; the antenna can be inductively couple to the transponder chip. Preferably, the included angle between the two antennas is 180°.

A third aspect of the invention is an assembly of a textile fabric and an RFID tag as in the second aspect of the invention. The RFID tag is fixed onto the textile fabric. The transponder chip can e.g. be fixed onto the textile fabric by means of a laminating foil, or by means of epoxy blob, or by means of glue. The antenna or antennas can be fixed onto the textile fabric by means of one or more stitching yarns.

Preferably the RFID-tag is fixed onto the textile fabric such that the antenna forms on the textile fabric a loop with overlapping ends. The transponder chip can be present on the fabric inside the loop with overlapping ends.

Preferably, the antenna is fixed onto the textile fabric, so that the antenna undulates on the textile fabric.

Preferably, the antenna is fixed onto the textile fabric by means of one or by means of more than one stitching yarns.

A fourth aspect of the invention is an apparel product, e.g. a gown, or a bed sheet, or a pillow cover or a towel comprising an assembly as in the third aspect of the invention.

BRIEF DESCRIPTION OF FIGURES IN THE DRAWINGS

Figure 2:
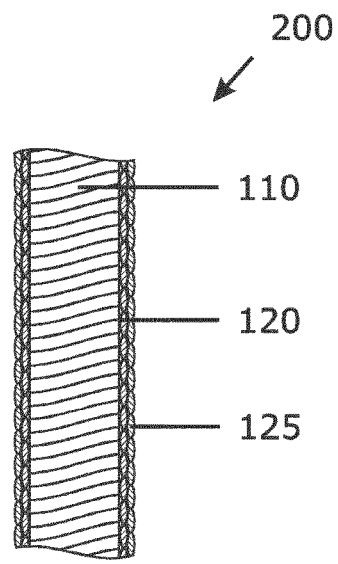
Figure 3:
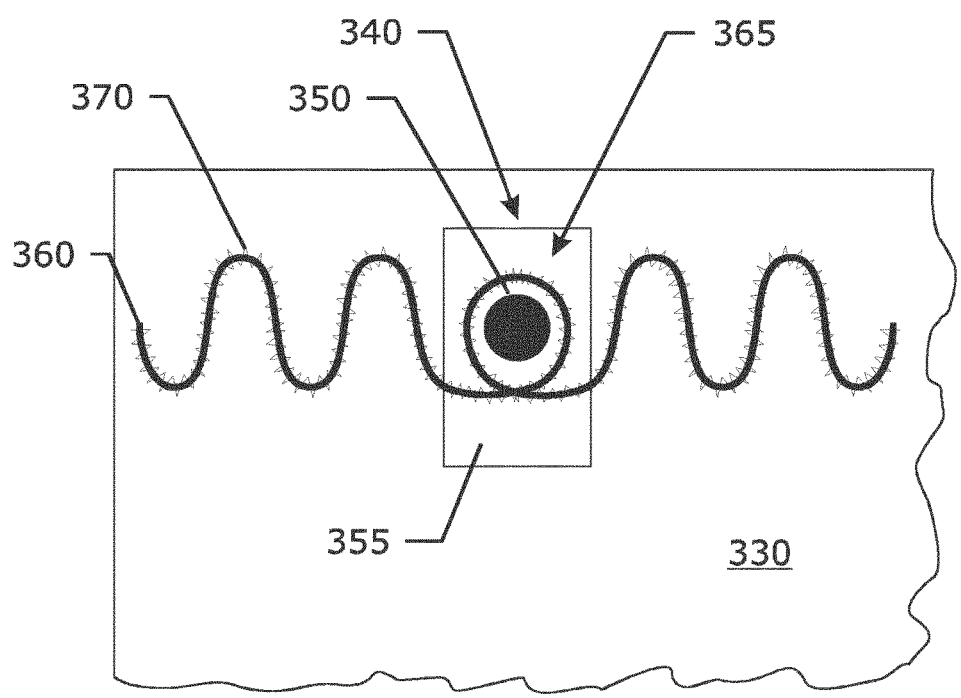

FIG. 1 shows the cross section of an antenna for an RFID tag according to the first aspect of the invention.
FIG. 2 shows the section in a plane through and along the axis of an antenna for an RFID tag according to the first aspect of the invention.
FIG. 3 shows a textile fabric and an RFID tag fixed onto the textile fabric.

MODE(S) FOR CARRYING OUT THE INVENTION

FIG. 1 shows the cross section 100 of an exemplary antenna for an RFID tag according to the first aspect of the invention. FIG. 2 shows the section 200 in a plane through and along the axis of an exemplary antenna for an RFID tag according to the first aspect of the invention. The exemplary RFID-antenna has been made using bundle drawn stainless steel filaments of 12 μm equivalent diameter out of 316L stainless steel (according to ASTM A240). A parallel bundle of 275 stainless steel filaments 110 has been twisted with 100 turns per meter in order to obtain a twisted yarn; the antenna yarn. A first wrapping yarn 120 is wrapped in Z-direction around the antenna yarn. A second wrapping yarn 125 is wrapped in S-direction around the antenna yarn. The wrapping yarns 120 and 125 create a full coverage of the surface of the antenna yarn.

The example of FIGS. 1 and 2 shows an antenna yarn wrapped in Z- and in S-direction, however, it is also possible to perform the invention using only wrapping in Z-direction or in S-direction; however wrapping in Z- and in S-direction is preferred.

FIG. 3 shows a textile fabric 330 and an RFID tag 340 fixed onto the textile fabric. The RFID tag 340 comprises a transponder chip 350 and an antenna 360 as in the first aspect of the invention. The antenna 360 is positioned undulating on the textile fabric and forms in the middle of its length a loop 365 with overlapping ends. The antenna 360 is inductively coupled to the transponder chip 350. The RFID tag 340 is fixed onto the textile fabric. The antenna 360 is fixed onto the textile fabric 330 by means of one or more than one stitching yarns 370. The transponder chip 360 is fixed onto the textile fabric by means of an, e.g. transparent, laminating foil 355. Alternatively, the transponder chip can e.g. be fixed onto the textile fabric by means of epoxy blob or glue.

A first example of an antenna for use in an RFID tag comprises an antenna yarn, provided out of 90 stainless steel filaments of 14 μm equivalent diameter, twisted together with a twist of 100 turns per meter. The stainless steel filaments of the antenna yarn have been made using bundle drawn stainless steel filaments out of 316L stainless steel (according to ASTM A240). The antenna yarn is wrapped in S-direction and in Z-direction by 76 dTex (=7.6 Tex) non-entangled texturized polyester multifilament yarns. The wrappings are done with 2250 turns per meter length of the antenna yarn. The wrapping non-entangled texturized polyester multifilament yarns cover the full surface of the antenna yarn. The antenna has a diameter of 0.23 mm.

A second example of an antenna for use in an RFID tag comprises an antenna yarn provided out of 275 stainless steel filaments of 12 μm equivalent diameter, twisted together with a twist of 100 turns per meter. The stainless steel filaments of the antenna yarn have been made using bundle drawn stainless steel filaments out of 316L stainless steel (according to ASTM A240). The antenna yarn is wrapped in S-direction and in Z-direction by 167 dTex (=16.7 Tex) non-entangled texturized polyester multifilament yarns. The wrappings are done with 1250 turns per meter length of the antenna yarn. The wrapping non-entangled texturized polyester multifilament yarns cover the full surface of the antenna yarn. The antenna has a diameter of 0.33 mm. Because the antenna yarn deforms easily and compresses when being touched before wrapping, it is difficult to measure its diameter prior to wrapping.

This antenna was compared with a prior art antenna with the same antenna yarn but having a polymer coating sheath instead of the wrapping yarns. The prior art antenna with the polymer coating sheath has a diameter of 0.55 mm. Analysing the cross section of the polymer sheath showed a coating layer thickness of 0.12 mm and a diameter of the antenna yarn in the antenna 0.31 mm. The coating layer thickness 0.12 mm was the lowest coating layer thickness that could be applied for full coverage of the surface of the antenna yarn with polymer. The wrapped antenna also showed a lower bending stiffness than the coated antenna.

A third example of an antenna for use in an RFID tag comprises an antenna yarn provided out of 275 stainless steel filaments of 12 μm equivalent diameter, twisted together with a twist of 100 turns per meter. The stainless steel filaments of the antenna yarn have been made using bundle drawn stainless steel filaments out of 316L stainless steel (according to ASTM A240). The antenna yarn is wrapped in S-direction and in Z-direction by 76 dTex (=7.6 Tex) non-entangled texturized polyester multifilament yarns. The wrappings are done with 2250 turns per meter length of the antenna yarn. The wrapping non-entangled texturized polyester multifilament yarns cover the full surface of the antenna yarn. The antenna has a diameter of 0.30 mm, indicating a larger compaction of the antenna yarn in the wrapping operation than in the second example, and the use of the thinner wrapping yarn than in the second example.

In the three examples, 316L stainless steel (according to ASTM A240) fibers have been used; however, other stainless steel grades can be used in the invention.

Instead of non-entangled texturized multifilament wrapping yarns, other yarns or tapes can be used as non-electrical conductive wrapping fiber material.

Although wrapping in S- and in Z-direction is preferred, wrapping in only one direction (S or Z) can be used in the invention.

A fourth example of an antenna for use is an RFID tag comprises an antenna yarn provided out of 275 stainless steel filaments of 12 μm equivalent diameter, twisted together with a twist of 100 turns per meter. The stainless steel filaments of the antenna yarn have been made using bundle drawn stainless steel filaments out of 316L stainless steel (according to ASTM A240). The stainless steel filaments have been annealed at 1000° C. to create an annealed microstructure of the stainless steel filaments. The antenna yarn is wrapped in S-direction and in Z-direction by 167 dTex (=16.7 Tex) non-entangled texturized polyester multifilament yarns. The wrappings are done with 1250 turns per meter length of the antenna yarn. The wrapping non-entangled texturized polyester multifilament yarns cover the full surface of the antenna yarn.

The antenna was virtually free of martensite, as determined by measuring the saturation field via magnetic measurement, and comparison with the measurement value of stainless steel samples with known martensite weight percentage to calculate the martensite weight percentage of the tested sample. An RFID-tag was made comprising a transponder chip and such antenna. The textile fabric with the exemplary RFID tag with the antennas as described in the example has been tested on the effect on MRI-scanner images. The effect was sufficiently low such that it did not affect the MRI images negatively.

The antenna has a diameter of 0.33 mm. This antenna was compared with a prior art antenna that has a polymer coating sheath and an antenna yarn similar in construction as the fourth example but comprising stainless steel filaments with an end-drawn microstructure. The prior art antenna with the polymer sheet has a diameter of 0.55 mm. Analysing the cross section of the polymer sheath showed a coating layer thickness of 0.12 mm and a diameter of the antenna yarn in the antenna 0.31 mm. The antenna of the fourth example showed improved reading distance compared to the prior art antenna yarn with a polymer coating. This improved reading distance is obtained by the difference in conductivity: the antenna of the fourth example has an electrical conductivity of 30 Ohm per meter length of the antenna, whereas the electrical conductivity of the prior art antenna (with antenna yarn with stainless steel filaments with end-drawn microstructure and with a polymer sheath) is 25 Ohm per meter length of the antenna.

A fifth example of an antenna for use in an RFID tag comprises an antenna yarn provided out of 275 stainless steel filaments of 12 μm equivalent diameter. The stainless steel filaments are present in parallel untwisted arrangement; this means as a bundle of untwisted, parallel stainless steel filaments. The stainless steel filaments of the antenna yarn have been made using bundle drawn stainless steel filaments out of 316L stainless steel (according to ASTM A240). The antenna yarn is wrapped in S-direction and in Z-direction by 76 dTex (=7.6 Tex) non-entangled texturized polyester multifilament yarns. The wrappings are done with 2250 turns per meter length of the antenna yarn. The wrapping non-entangled texturized polyester multifilament yarns cover the full surface of the antenna yarn.

Other wrapping yarns can be used than the ones listed in the first, second, third, fourth and fifth example. Advantageously, tapes can be used as wrapping yarns. Specific examples of cross sections of tapes that can be used in the invention are e.g. 250 micrometer by 12 micrometer, 350 micrometer by 12 micrometer, 370 micrometer by 12 micrometer and 250 micrometer by 23 micrometer, e.g. in polyester.

The invention claimed is:

1. Antenna for use in an RFID tag,
   wherein the antenna comprises an antenna yarn,
   wherein the antenna yarn comprises metal fibers,
   wherein the metal fibers are stainless steel fibers,
   wherein the antenna yarn is wrapped by at least one wrapping yarn thereby covering the full surface of the antenna yarn, and
   wherein the at least one wrapping yarn comprises non-electrically conductive fibers.

2. Antenna as in claim 1, wherein the stainless steel fibers have an equivalent diameter less than 20 μm.

3. Antenna as in claim 1, wherein the antenna yarn comprises at least 80 stainless steel fibers in its cross section.

4. Antenna as in claim 1, wherein the at least one wrapping yarn is at least one tape.

5. Antenna as in claim 1, wherein each of the at least one wrapping yarns is wrapped around the antenna yarn with more than 1000 turns per meter length of the antenna yarn.

6. Antenna as in claim 1,
   wherein the antenna yarn is wrapped by a wrapping yarn in S-direction;
   and wherein the antenna yarn is wrapped by a wrapping yarn in Z-direction.

7. Antenna as in claim 6, wherein the number of wrapping turns of the wrapping yarn wrapping the antenna yarn in Z-direction are the same as the number of wrapping turns of the wrapping yarn wrapping the antenna yarn in S-direction.

8. Antenna as in claim 1,
   wherein the stainless steel fibers are present as filaments; or wherein the stainless steel fibers are present as fibers of discrete length.

9. Antenna as in claim 1, wherein the stainless steel fibers are present as filaments in parallel untwisted arrangement.

10. Antenna as in claim 1,
   wherein the antenna yarn comprises twisted or cabled multifilament stainless steel fibers, or
   wherein the stainless steel fibers are present in the antenna yarn as filaments in parallel untwisted arrangement, and
   wherein the antenna yarn is wrapped by a wrapping yarn in S-direction, and
   wherein the antenna yarn is wrapped by a wrapping yarn in Z-direction.

11. Antenna as in claim 1, wherein the stainless steel fibers have a martensite percentage by weight less than 5%.

12. RFID tag comprising a transponder chip and an antenna as in claim 1, wherein the antenna is coupled to the transponder chip.

13. Assembly of a textile fabric and an RFID tag as in claim 12, wherein the RFID tag is fixed onto the textile fabric.

14. Assembly as in claim 13, wherein the antenna is fixed onto the textile fabric by means of one or by means of more than one stitching yarn.

15. Apparel product or bed sheet or pillow cover or towel comprising an assembly as claim 13.

* * * * *